(12) United States Patent
Bai et al.

(10) Patent No.: US 8,488,897 B2
(45) Date of Patent: Jul. 16, 2013

(54) METHOD AND DEVICE FOR IMAGE FILTERING

(75) Inventors: Meng Bai, Guangdong Province (CN); Meng Li, Guangdong Province (CN); Han Lin, Guangdong Province (CN); Xingguo Sun, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1615 days.

(21) Appl. No.: 11/954,630

(22) Filed: Dec. 12, 2007

(65) Prior Publication Data
US 2008/0193036 A1 Aug. 14, 2008

(30) Foreign Application Priority Data

Feb. 13, 2007 (CN) .......................... 2007 1 0063866

(51) Int. Cl.
*G06K 9/40* (2006.01)
(52) U.S. Cl.
USPC ..... 382/260; 382/274; 348/222.1; 348/226.1; 348/447
(58) Field of Classification Search
USPC .................... 382/260, 274; 348/222.1, 226.1, 348/447
See application file for complete search history.

(56) References Cited

U.S. PATENT DOCUMENTS

| | | | | |
|---|---|---|---|---|
| 5,990,965 A | * | 11/1999 | Herz et al. | 348/446 |
| 6,061,094 A | * | 5/2000 | Maietta | 348/446 |
| 6,067,120 A | * | 5/2000 | Horikawa et al. | 348/447 |
| 6,130,723 A | * | 10/2000 | Medin | 348/607 |
| 6,327,003 B1 | * | 12/2001 | Vos | 348/569 |
| 6,346,970 B1 | * | 2/2002 | Boehlke | 348/447 |

(Continued)

FOREIGN PATENT DOCUMENTS

| CN | 1250570 A | 4/2000 |
|---|---|---|
| CN | 1315806 A | 10/2001 |

(Continued)

OTHER PUBLICATIONS

Foreign communication from a counterpart application, Chinese application 200710063866.7, Notice of Allowance dated Apr. 14, 2009, 1 page.

(Continued)

*Primary Examiner* — Aaron W Carter
(74) *Attorney, Agent, or Firm* — Conley Rose, P.C.; Grant Rodolph; Raychao Chung (57) ABSTRACT

The invention discloses a method and device for image filtering in the field of communication technologies, the method including: acquiring image data of a pixel dot of a current row to be filtered and a corresponding pixel dot of at least one adjacent row; obtaining contrast information containing a transparency value, of the pixel dot of the current row and the pixel dot of the adjacent row respectively by resolving the image data of the pixel dot of the current row and the pixel dot of the adjacent row; generating a filter coefficient according to the transparency value of the pixel dot of the current row and the transparency value of the corresponding pixel dot of the adjacent row; and performing filtering on the pixel dot of the current row with the filter coefficient. The embodiments of the invention effectively avoid image flickering due to a difference between contrasts by adopting the method of at-least-two-row vertical filtering, and by generating the filter coefficients according to the transparencies in filtering.

12 Claims, 4 Drawing Sheets

U.S. PATENT DOCUMENTS

| | | | |
|---|---|---|---|
| 6,469,707 B1 * | 10/2002 | Voorhies | 345/589 |
| 6,545,719 B1 * | 4/2003 | Topper | 348/448 |
| 6,545,724 B1 * | 4/2003 | Gryskiewicz | 348/597 |
| 6,646,686 B1 * | 11/2003 | Gryskiewicz et al. | 348/584 |
| 6,738,072 B1 | 5/2004 | MacInnis et al. | |
| 7,119,815 B1 * | 10/2006 | Cahill, III | 345/629 |
| 7,391,476 B2 * | 6/2008 | Hahn | 348/625 |
| 2005/0168480 A1 | 8/2005 | MacInnis et al. | |
| 2005/0220365 A1 * | 10/2005 | Hahn | 382/300 |
| 2007/0247531 A1 * | 10/2007 | Deng et al. | 348/226.1 |

FOREIGN PATENT DOCUMENTS

| | | |
|---|---|---|
| CN | 1678057 A | 10/2005 |
| WO | 9937091 A1 | 7/1999 |
| WO | WO 9937091 A1 * | 7/1999 |

OTHER PUBLICATIONS

Foreign communication from a counterpart application, Chinese application 200710063866.7, Office action dated Jul. 10, 2008, 4 pages.

* cited by examiner

METHOD AND DEVICE FOR IMAGE FILTERING

This application claims a priority from the Chinese Patent Application No. 200710063866.7, filed with the Chinese Patent Office on Feb. 13, 2007, entitled "METHOD AND DEVICE FOR INTERLACED DISPLAY ANTI-FLICKERING", contents of which are incorporated herein by reference in its entirety.

FIELD OF THE INVENTION

The present invention relates to the field of communication technologies and in particular to a method and device for image filtering.

BACKGROUND OF THE INVENTION

Figure 1:
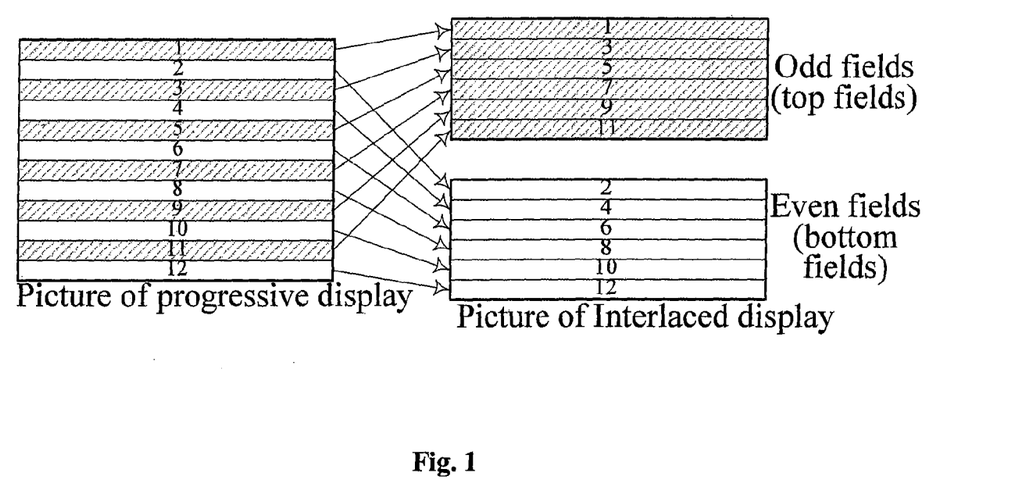
FIG. 1 is a schematic diagram of conversion of a progressive picture into an interlaced picture in the prior art.

Currently, most televisions employ interlaced display technique for displaying images. The interlaced display can greatly reduce the bandwidth used for transmission of signals. However, when an image edited on a computer is to be displayed in an interlaced way on a television, quality of the image tends to be degraded due to a flicker feeling with respect to the image. This results from differences between display principles of the television and the computer, where the progressive display is used for the computer, and the interlaced display is used for the television. When converting the progressive display into the interlaced display, progressive pictures are divided into odd field pictures consisting of odd rows and even field pictures consisting of even rows, which are then displayed on the television at a field frequency of 60 Hz or 50 Hz, as illustrated in FIG. 1.

As can be seen from above, systems of televisions and computers are not compatible in display. However, markets of televisions and computers have already become confluent. Driven by the market force, an effective method capable of linking two systems is cried for.

One method used commonly is vertical filtering of brightness, which includes an N-order low-pass filter capable of storing N-row image data. The frequency spectrum of two adjacent rows with a relatively large bright-dark contrast is distributed in high frequency part of the frequency field. The use of the low-pass filter can suppress energy of high frequency components, thereby alleviating the bright-dark contrast of the adjacent rows, so that the flicker feeling caused by those adjacent rows will not occur in the image, and thus an anti-flickering function can be achieved.

Figure 2:
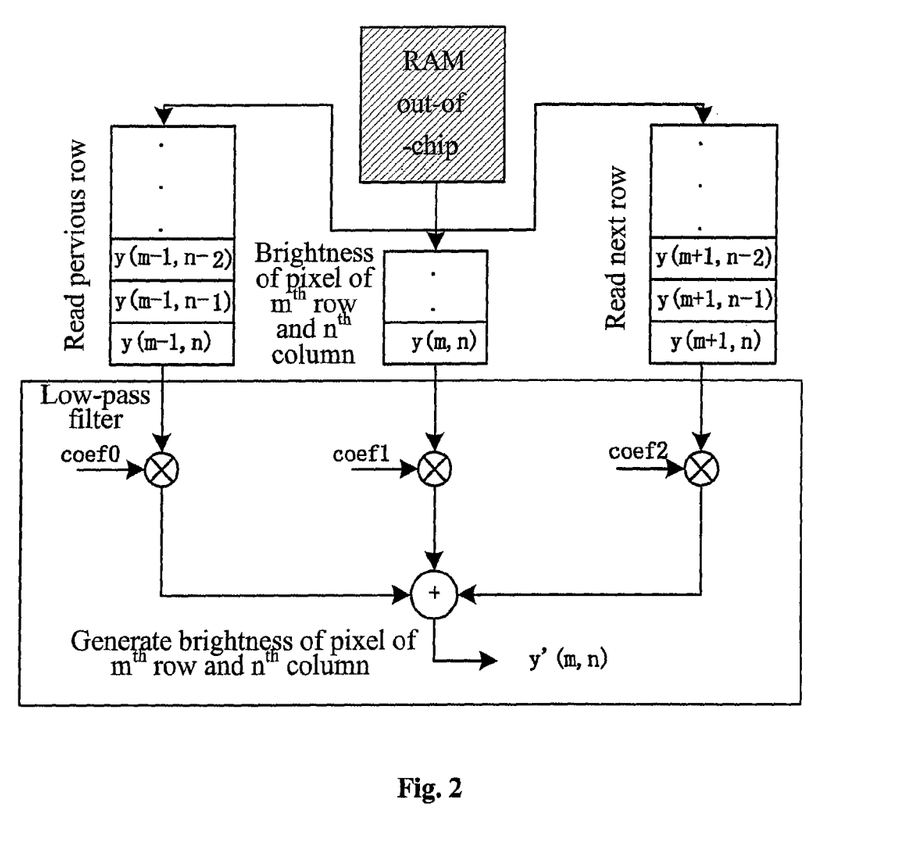
FIG. 2 is a schematic diagram of vertical low-pass filtering in the prior art.

FIG. 2 shows a method for implementing vertical filtering in the prior art. Pictures edited with a computer are stored in an external RAM. When data of the $m^{th}$ row and the $n^{th}$ column is to be displayed, firstly points of columns corresponding to three adjacent rows (the $(m-1)^{th}$ row, the my row, and the $(m+1)^{th}$ row,) are read into a in-chip register, and then are filtered through the low-pass filter, and thus new point y'(m, n) is generated to replace the corresponding point which has been filtered.

The method using the vertical low-pass filtering is disadvantageous in that an effect of a pixel transparency (an Alpha value) on anti-flickering has not been taken into account. There are different transparencies in different regions within an original picture, which greatly influences the visual effect. When adjacent rows are identical in brightness but quite different in transparency, the flickering effect may occur. If only vertical filtering of brightness is performed here, then the flickering due to a difference between the transparencies can not be avoided and hence such a flickering still fails to be avoided effectively.

SUMMARY OF THE INVENTION

One or more embodiments of the invention provide a method and device for image filtering.

The embodiments of the invention are implemented with the following solutions.

An embodiment of the invention provides a method for image filtering including: acquiring image data of a pixel dot of a current row to be filtered and a corresponding pixel dot of at least one adjacent row; obtaining contrast information containing a transparency value, of the pixel dot of the current row and the pixel dot of the adjacent row respectively by resolving the image data of the pixel dot of the current row and the pixel dot of the adjacent row; generating a filter coefficient of the pixel dot of the current row according to the transparency value of the pixel dot of the current row and the transparency value of the corresponding pixel dot of the adjacent row; and performing filtering on the pixel dot of the current row with the filter coefficient.

An embodiment of the invention provides a device for image filtering including: a pixel acquiring unit, adapted to acquire image data of the pixel dots a current row to be filtered and at least one adjacent row; and a pixel filtering unit, adapted to resolve the image data of the pixel dots of the current row and the adjacent row, to generate a filter coefficient according to a transparency value of the pixel dot of the current row and a transparency value of the corresponding pixel dot of the adjacent row, obtained respectively from resolving the image data, and to perform filtering on the pixel dot of the current row with the filter coefficient.

An embodiment of the invention provides a system for image filtering, comprising a device configured to acquire image data of a pixel dot of a current row to be filtered and a corresponding pixel dot of at least one adjacent row; and perform a filtering processing according to a transparency value of the pixel dot of the current row and a transparency value of the corresponding pixel dot of the adjacent row.

One or more embodiments of the invention employ a two-row vertical filter processing with filter coefficients generated from transparencies and effectively avoid image flickering due to a difference between contrasts.

DETAILED DESCRIPTION OF THE EMBODIMENTS

Figure 3:
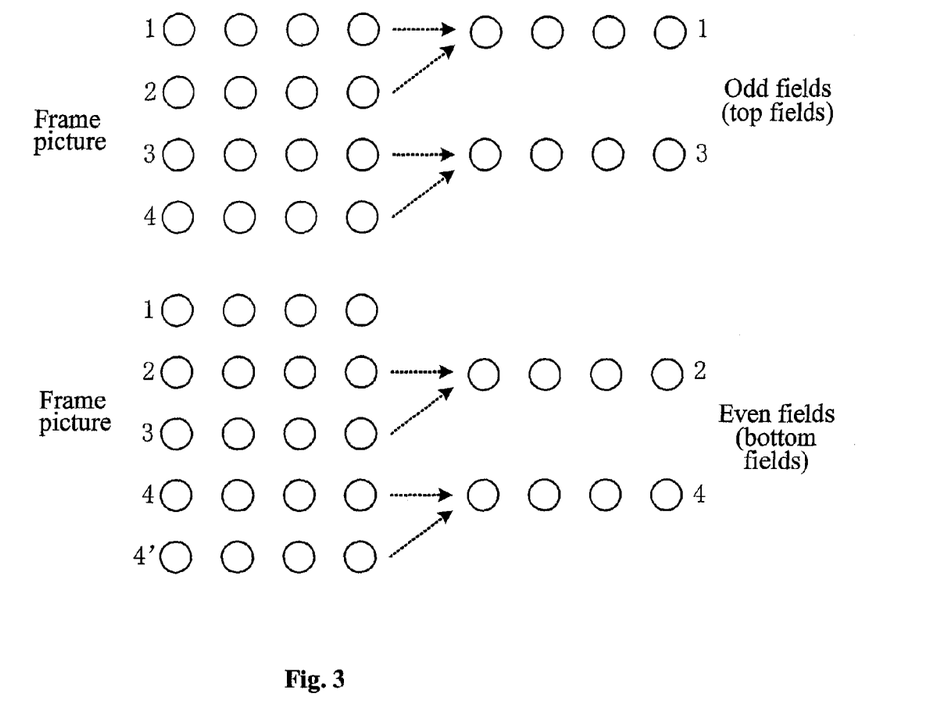
FIG. 3 is a diagram of generating of a field picture from a frame picture through two-row filtering according to an embodiment of the invention.

Since a flicker feeling occurs due to a relatively great difference between contrasts of two adjacent rows, embodiments of the invention avoid a flicker through vertical filtering between at least two rows, which takes transparency values into account. Referring to FIG. 3, a procedure of forming two field pictures from a frame picture through two-row filtering is illustrated.

Odd fields (top fields) are obtained through performing vertical filtering on the pixel dots of the first row and the third row with the corresponding pixel dots of their corresponding next rows, the second row and the fourth row.

Even fields (bottom fields) are obtained through performing vertical filtering on the pixel dots of the second row with the corresponding pixel dots of its next row, the third row, as well as through performing vertical filtering on the pixel dots of the last row, the fourth row, using an edge extension method, which is such that the last row is duplicated according to the number of rows required for vertical filtering, and then vertical filtering is performed on the pixel dots of the current row with the corresponding pixel dots of the duplicated rows.

New pixel dots obtained from the filtered pixel dots of a current row and its next row thus have the anti-flickering function. For the two-row vertical filtering proposed in the present embodiment, transparencies are used to obtain filter coefficients, and thus the flicker feeling which occurs due to different transparencies can be eliminated. When contrast information is required to be obtained for pixel dots after anti-flicker processing, contrast information to be filtered, such as brightness, of the corresponding pixel dots of the two rows can be multiplied respectively by the filter coefficients, and then the calculating results are combined to obtain the corresponding contrast information of the respective filtered pixel dots. Thereafter, the contrast information obtained after filtering process, the transparency values, and other contrast information such as chroma are combined, acquiring filtered image data. For instance, when a brightness value is to be obtained for a pixel dot (r, c) after anti-flicker processing, the value can be calculated with the following formula:

$$Y'(r, c) = \frac{Alpha(r, c)}{Alpha(r+1, c) + Alpha(r, c)} \times Y(r, c) + \frac{Alpha(r+1, c)}{Alpha(r+1, c) + Alpha(r, c)} \times Y(r+1, c)$$

In the formula, Alpha(r, c) indicates a transparency value of the pixel dot (r, c);

Alpha(r+1, c) indicates a transparency value of a pixel dot (r+1, c);

Y(r,c) indicates a brightness component of the pixel dot (r, c);

Y(r+1, c) indicates a brightness component of the pixel dot (r+1, c);

r indicates a row number, and c indicates a column number; Where $$\frac{Alpha(r, c)}{Alpha(r+1, c) + Alpha(r, c)} \text{ and } \frac{Alpha(r+1, c)}{Alpha(r+1, c) + Alpha(r, c)}$$

are filter coefficients calculated from the transparency values. The filter coefficients can be calculated not only from the transparency values, as long as that calculation of the filter coefficients takes the transparency values into account.

The above formula is also applicable for process of other color mode such as RGB, etc.

Precision of the filter coefficients, chosen from ¼, ⅛, ¹⁄₁₆, or ¹⁄₃₂, etc., can be determined according to the needs. The above precision can be used to ensure a greatly simplified circuit scale while maintaining an image quality.

The method of vertical filtering presented in this embodiment can be extended to multi-rows vertical filtering, that is, more than two rows are filtered. For the case of three rows, filtering process can be performed concurrently on the corresponding pixel dots of three adjacent rows, such as a previous row, a current row, and a next row. Thus the effect will be enhanced, but the circuit area will be increased and more resources, such as a bus bandwidth, will be occupied. Processing complexity can be increased if a high-end user needs so. In one word, generation of the filter coefficients is according to Alpha values.

The embodiments of the invention will be described in details hereinafter with reference to the drawings.

Figure 4:
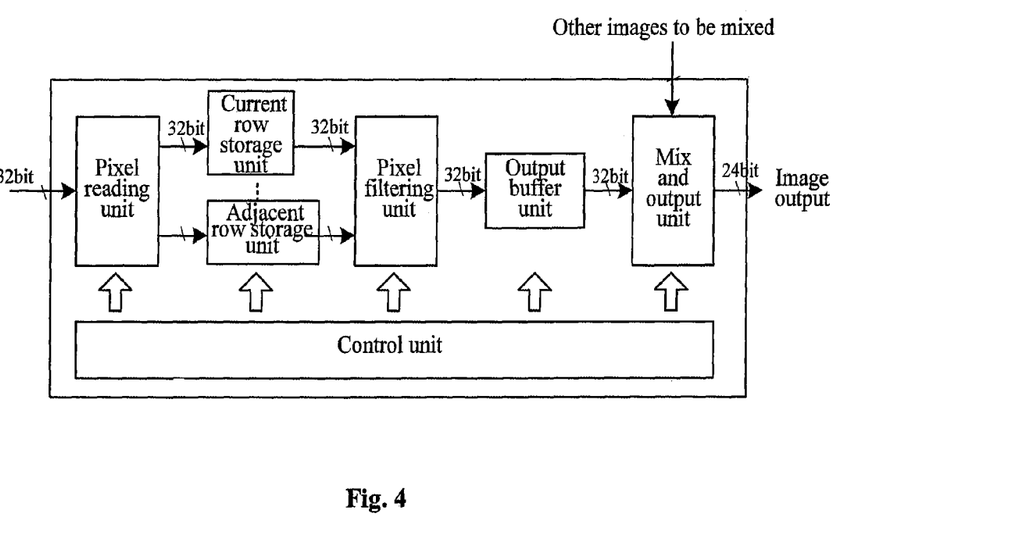
FIG. 4 is a schematic structural diagram of components of a device according to a first embodiment of the invention.

A device for image filtering is provided in a first embodiment of the invention. Referring to FIG. 4, a structural diagram of the device according to the present embodiment is illustrated. The device includes a pixel reading unit, a current row storage unit, an adjacent row storage unit, a pixel filtering unit, and a control unit. Alternatively, the device further includes an output buffer unit and a mix and output unit. Functions of respective units will be described in details hereinafter.

The pixel reading unit, functioning as an interface through which the device is connected to the outside, is adapted to read, from a memory, image data of a current row to be processed and at least one adjacent row, and to store the data into corresponding storage units. The read image data can include totally 32-bit information, including 24-bit of brightness and colors, and 8-bit of transparencies of respective pixels.

The current row storage unit and the adjacent row storage unit are adapted respectively to store the image data of the current row and the image data of the adjacent row, which is read by the pixel reading unit. There are multiple adjacent row storage units when a method of more-than-two row filtering is used.

Figure 5:
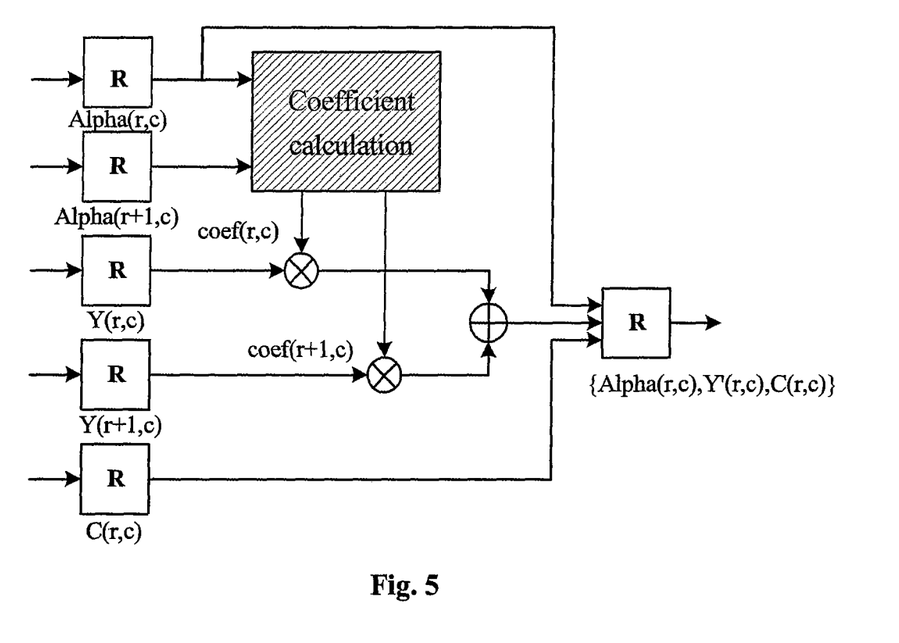
FIG. 5 is a logic structural diagram of components of a pixel filtering unit according to an embodiment of the invention.

The pixel filtering unit is adapted to perform pixel-filtering processing on the image data stored in the current row storage unit and the adjacent row storage unit. Taking two-row filtering as an example, a general logic structure of this unit is as illustrated in FIG. 5, where a signal flow is as following.

Firstly, data is read from the current row storage unit and the adjacent row storage unit, and is resolved to obtain a transparency value Alpha(r, c), a brightness Y(r, c), and a chroma C(r, c) (or an Alpha value, a red component, a green component, and a blue component, as the format of storage) of a pixel dot to be processed, as well as a transparency value Alpha(r+1, c) and a brightness Y(r+1, c) of a corresponding pixel dot of an adjacent row, and the information is stored. Then, filter coefficients coef(r, c) and coef(r+1, c) of the corresponding pixel dots are calculated from the transparency Alpha values of the two pixel dots, where a method for calculation of coef(r, c) and coef(r+1, c) can be implemented through various circuits. The following formula can be used for calculation:

$$coef(r, c) = \frac{Alpha(r, c)}{Alpha(r+1, c) + Alpha(r, c)}$$

$$coef(r+1, c) = \frac{Alpha(r+1, c)}{Alpha(r+1, c) + Alpha(r, c)}.$$

Precision of the filter coefficients, chosen from ¼, ⅛, ¹⁄₁₆, or ¹⁄₃₂, etc, can be determined according to the needs. The above precision can be used to ensure a greatly simplified circuit scale while maintaining image quality.

Thereafter, filtering is performed on Y(r, c) and Y(r+1, c) of the corresponding pixel dots with the following formula, thus obtaining Y'(r, c):

$$Y'(r, c) = \frac{Alpha(r, c)}{Alpha(r+1, c) + Alpha(r, c)} \times Y(r, c) + \frac{Alpha(r+1, c)}{Alpha(r+1, c) + Alpha(r, c)} \times Y(r+1, c),$$

Y'(r, c) is combined with Alpha(r, c) and C(r, c) to obtain data information of the filtered pixel dot. For instance, Alpha, Cr, Y, and Cb are combined to form a new 32-bit pixel dot data. For a color mode such as RGB, respective color components can be filtered respectively with the above formula.

The output buffer unit is adapted to buffer image data obtained from filtering by the pixel filtering unit, and can be adapted to match a processing rate and a display rate of the pixel filtering unit.

The mix and output unit is adapted to mix the image data buffered in the output buffer unit with other images data to be mixed, and to output the mixed image data, to obtain more variable image effects. Mix weights of the images relative to each other are according to transparency values of the respective images.

The control unit is adapted to provide control instructions for normal operations of the respective units, including generating a row field synchronization signal, unifying operating time of the respective units, feeding back the operating statuses of respective units, etc.

Further, some external registers can be added if they are required for the device to interact with the outside regarding an operation control or an operation status.

Figure 6:
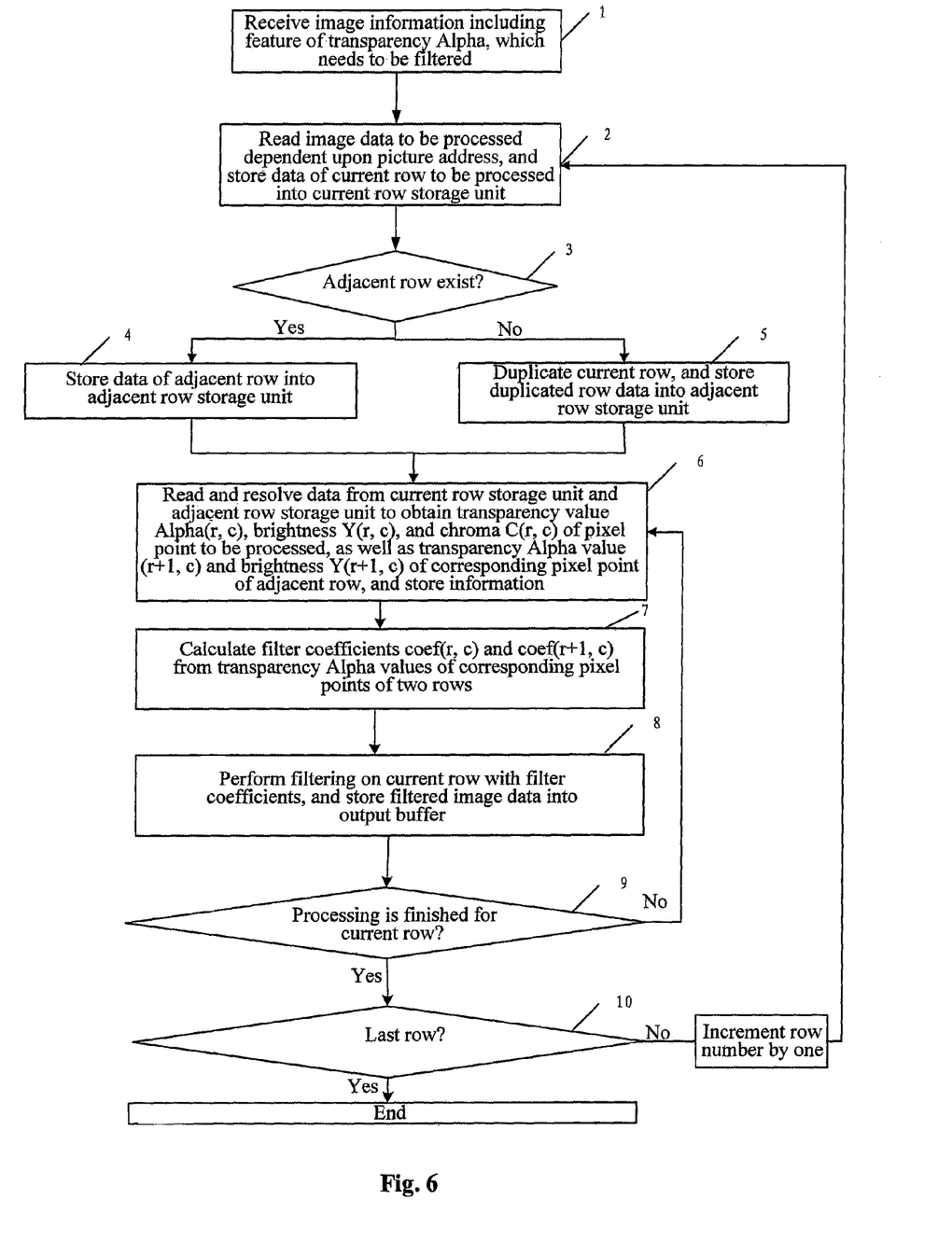
FIG. 6 is a flow chart of a method according to a second embodiment of the invention.

As shown in FIG. 6, a method for image filtering is provided in a second embodiment of the invention, which includes the following blocks.

In the block 1, image information including the feature of a transparency Alpha is received, which needs to be filtered.

As filtering is required to be performed on an image, the control unit receives information on the image, where the image includes an image used as an OSD interface of a television, or as a television background, etc. The information on the image includes an address where a picture is stored, a width and a height of the picture, etc.

Pixel data including the feature of an Alpha can be of the following structure:

| Alpha | Cb | Y | Cr |
|-------|----|----|----|
| 31 | 23 | 15 | 7   0 bit |

In the block 2, upon receipt of the image information, the control unit notifies of the pixel reading unit, and the pixel reading unit reads the image data to be processed according to the picture address, and stores data of the current row to be processed into the current row storage unit.

In the block 3, it is determined whether an adjacent row is present, and if so, it proceeds to the step 4, otherwise it proceeds to the step 5.

In the block 4, data of the adjacent row is stored into the adjacent row storage unit.

In the block 5, the current row is duplicated, and the duplicated row data is stored into the adjacent row storage unit.

In the block 6, the data is read from the current row storage unit and the adjacent row storage unit, and is resolved to obtain a transparency value Alpha(r, c), a brightness Y(r, c), and a chroma C(r, c) (or an Alpha value, a red component, a green component, and a blue component, as the format of storage) of a pixel dot to be processed, as well as a transparency Alpha value (r+1, c) and a brightness Y(r+1, c) of a corresponding pixel dot of the adjacent row, and the information is stored.

In the block 7, filter coefficients coef(r, c) and coef(r+1, c) of the respective pixel dots are calculated from the transparency Alpha values of the corresponding pixel dots of the two rows.

A method for calculating coef(r, c) and coef(r+1, c) can be implemented through various circuits. The following formula can be used for calculation:

$$coef(r, c) = \frac{Alpha(r, c)}{Alpha(r+1, c) + Alpha(r, c)}$$

$$coef(r+1, c) = \frac{Alpha(r+1, c)}{Alpha(r+1, c) + Alpha(r, c)}$$

In the block 8, filtering is performed on the pixel dot of the current row with the above filter coefficients through the following formula:

$$Y'(r, c) = \frac{Alpha(r, c)}{Alpha(r+1, c) + Alpha(r, c)} \times Y(r, c) + \frac{Alpha(r+1, c)}{Alpha(r+1, c) + Alpha(r, c)} \times Y(r+1, c)$$

Data of the filtered pixel dot (r, c) calculated with the above formula is stored into the output buffer.

In the block 9, it is determined whether the processing has been finished for the current row, in other words, whether there is a pixel dot on which filtering has not been performed yet for the current row, and if not, the operations from the step 6 to the step 8 are repeated, otherwise it proceeds to the step 10.

In the block 10, it is determined whether the row for which the processing has been finished is the last row, and if not, the row number is incremented by one, and a subsequent row is processed as above, otherwise it is ended.

The filtered data in the output buffer unit can be output together with other images which needs to be mixed.

Summarily, the embodiments of the invention effectively avoid image flickering due to a difference between contrasts by adopting the method of at-least-two-row vertical filtering, and by calculating the filter coefficients according to the transparencies in filtering. Also, the images with respective transparencies can be mixed to obtain more complex and variable visual effects.

The descriptions mentioned above are merely the preferred embodiments of the inventions, and the scope claimed for the invention shall not be limited to this. Modifications and variations which can readily occur to those skilled in the art in light of the disclosure herein shall be encompassed in the scope of the invention, which accordingly shall be defined as the appended claims.

What is claimed is:

1. A method for image filtering, comprising:
acquiring image data of a pixel dot of a current row to be filtered and a corresponding pixel dot of at least one adjacent row;
obtaining a transparency value of the pixel dot of the current row and a transparency value of the pixel dot of the adjacent row;
generating a filter coefficient of the pixel dot of the current row according to the following formula:

$$coef(r, c) = \frac{\text{Alpha}(r, c)}{\text{Alpha}(r+1, c) + \text{Alpha}(r, c)},$$

wherein the coef(r,c) is the filter coefficient of the pixel dot of the current row, the Alpha(r,c) is the transparency value of the pixel dot of the current row, and the Alpha(r+1,c) is the transparency value of the corresponding pixel dot of the adjacent row; and
performing filtering processing on the pixel dot of the current row with the filter coefficient.

2. The method according to claim 1, wherein a duplicate of the current row is used as the adjacent row to generate the filter coefficient when there is no adjacent row for the current row.

3. The method according to claim 1, wherein before acquiring the image data, the method further comprises:
receiving information of an image to be filtered that comprises the address of the image;
acquiring the image data according to the address of the image; and
storing the image data of the current row and at least one of the adjacent rows into a storage unit.

4. The method according to claim 1, wherein performing filtering on the pixel dot of the current row with the filter coefficient comprises:
performing filtering on a contrast information to be filtered of the pixel dot of the current row according to the following formula:
X'(r,c)=Coef(r,c)×X(r,c)+Coef(r+1,c)×X(r+1,c), wherein the X(r,c) is the contrast information for of the pixel dot of the current row, the X(r+1,c) is the contrast information for the corresponding pixel dot of the adjacent row, the Coef(r,c) is the filter coefficient of the pixel dot of the current row, the Coef(r+1,c) is the filter coefficient of the pixel dot of the adjacent row, and the X'(r,c) is the contrast information of the filtered pixel dot for the pixel dot of the current row; and
combining the contrast information for the filter pixel dot and the contrast information from a plurality of other rows to obtain filtered image data of the pixel dot of the current row,
wherein the contrast information comprises a chroma value, a brightness value, or a red/green/blue component information.

5. The method according to claim 1, wherein after filtering, the method further comprises:
storing a filtered image data into an output buffer;
mixing the filtered image data stored in the output buffer with other image data that needs to be mixed and output to produce a mixed image data; and
outputting the mixed image data.

6. A device for image filtering, comprising:
a pixel reading unit adapted to acquire from a memory an image data of a pixel dot of a current row to be filtered and a corresponding pixel dot of at least one adjacent row; and
a pixel filtering unit coupled to the pixel reading unit, wherein the pixel filtering unit is adapted to:
obtain the image data of the pixel dots of the current row and the adjacent row;
generate a filter coefficient according to a transparency value of the pixel dot of the current row and a transparency value of the corresponding pixel dot of the adjacent row obtained, wherein the filter coefficient is not for an entire graphic image;
perform filtering on the pixel dot of the current row with the filter coefficient.

7. The device according to claim 6, further comprising:
a current row storage unit coupled to the pixel reading unit and the pixel filtering unit such that the current row storage unit is positioned between the pixel reading unit and the pixel filtering unit, wherein the current row storage unit is adapted to store the image data of the current row acquired by the pixel reading unit; and
an adjacent row storage unit coupled to the pixel reading unit and the pixel filtering unit such that the adjacent row storage unit is positioned between the pixel reading unit and the pixel filtering unit, wherein the adjacent row storage unit is adapted to store the image data of at least one of the adjacent rows acquired by the pixel reading unit.

8. The device according to claim 6, further comprising:
an output buffer unit coupled to the pixel filtering unit, wherein the output buffer unit is adapted to buffer image data obtained from filtering by the pixel filtering unit; and
a mix and output unit coupled to the output buffer unit, wherein the mix and output unit is adapted to mix the image data buffered in the output buffer unit with other image data to be mixed, and to output the mixed image data.

9. The device according to claim 6, further comprising a control unit adapted to provide control instructions for normal operations of the respective units.

10. The device according to claim 6, wherein generating the filter coefficient of the pixel dot of the current row comprises applying a formula:

$$coef(r, c) = \frac{\text{Alpha}(r, c)}{\text{Alpha}(r+1, c) + \text{Alpha}(r, c)},$$

wherein the coef(r,c) is the filter coefficient of the pixel dot of the current row, the Alpha(r,c) is the transparency value of the pixel dot of the current row, and the Alpha(r+1,c) is the transparency value of the corresponding pixel dot of the adjacent row.

11. The device according to claim 6, wherein the filter coefficient is generated using only the current row and the adjacent rows.

12. A device for image filtering, comprising:
a pixel reading unit adapted to acquire from a memory an image data of a pixel dot of a current row to be filtered and a corresponding pixel dot of at least one adjacent row; and a pixel filtering unit adapted to:
  obtain the image data of the pixel dots of the current row and the adjacent row;
  generate a filter coefficient of the pixel dot of the current row according to the following formula:

$$coef(r, c) = \frac{\text{Alpha}(r, c)}{\text{Alpha}(r+1, c) + \text{Alpha}(r, c)},$$

wherein the coef(r,c) is the filter coefficient of the pixel dot of the current row, the Alpha(r,c) is the transparency value of the pixel dot of the current row, and the Alpha(r+1,c) is the transparency value of the corresponding pixel dot of the adjacent row; and
  perform filtering on the pixel dot of the current row with the filter coefficient.

\* \* \* \* \*

UNITED STATES PATENT AND TRADEMARK OFFICE
CERTIFICATE OF CORRECTION

PATENT NO. : 8,488,897 B2  
APPLICATION NO. : 11/954630  
DATED : July 16, 2013  
INVENTOR(S) : Meng Bai et al.

Page 1 of 1

It is certified that error appears in the above-identified patent and that said Letters Patent is hereby corrected as shown below:

Title Page - Item (74) should read as follows:

(74) Attorney, Agent, or Firm – Conley Rose, P.C.; Grant Rodolph; Rayhao Chung

In the Claims

Column 7 Line 37 - Line 59 – Claim 4 should read as follows:

4. The method according to claim 1, wherein performing filtering on the pixel dot of the current row with the filter coefficient comprises:
performing filtering on a contrast information to be filtered of the pixel dot of the current row according to the following formula:

$$X`(r,c) = Coef(r,c) \times X(r,c) + Coef(r+1,c) \times X(r+1,c),$$

wherein the $X(r,c)$ is the contrast information for the pixel dot of the current row, the $X(r+1,c)$ is the contrast information for the corresponding pixel dot of the adjacent row, the $Coef(r,c)$ is the filter coefficient of the pixel dot of the current row, the $Coef(r+1,c)$ is the filter coefficient of the pixel dot of the adjacent row, and the $X'(r,c)$ is, the contrast information of the filtered pixel dot for the pixel dot of the current row; and
combining the contrast information for the filter pixel dot and the contrast information from a plurality of other rows to obtain filtered image data of the pixel dot of the current row,
wherein the contrast information comprises a chroma value, a brightness value, or a red/green/blue component information.

Signed and Sealed this  
Seventeenth Day of September, 2013

Teresa Stanek Rea  
*Deputy Director of the United States Patent and Trademark Office*